United States Patent [19]

Mendelsohn et al.

[11] 4,397,834
[45] Aug. 9, 1983

[54] METHOD OF GETTERING HYDROGEN UNDER CONDITIONS OF LOW PRESSURE

[76] Inventors: Marshall H. Mendelsohn, Woodridge; Dieter M. Gruen, Downers Grove, both of Ill., granted to U.S. Department of Energy under the provisions of U.S.C. 2182

[21] Appl. No.: 337,339

[22] Filed: Jan. 6, 1982

Related U.S. Application Data

[62] Division of Ser. No. 196,710, Oct. 14, 1980, abandoned.

[51] Int. Cl.³ .......................... C01B 6/74; C22C 16/00
[52] U.S. Cl. ..................... 423/644; 420/900; 420/422; 420/428; 420/424; 420/588
[58] Field of Search ................. 75/177, 134 F, 134 N, 75/134 V, 176; 423/644, 645, 648 R; 62/48; 34/15

[56] References Cited

U.S. PATENT DOCUMENTS 4,163,666 8/1979 Shaltiel et al. .......................... 75/177

OTHER PUBLICATIONS

Nomura K., Ishido Y., Ono S., "A Novel Thermal Engine Using Metal Hydride", *Energy Conversion,* vol. 19, pp. 49 to 57, Oct. 13, 1978.

Van Mal, H. H. et al., "Hydrogen Absorption in LaNi₅ and Related Compounds: Experimental Observations and their Explanation.", Journal of Less Common Metals, vol. 35 (1974), pp. 65-76.

Pebler, A. et al., "Equilibrium Studies on the Systems ZrCr-H₂, ZrV₂-H₂, and ZrMo₂-H₂ between 0° and 900° C., Transactions of the Metallurgized Society of AIME, vol. 239 (10/67), pp. 1593-1600.

Rohy, D. et al., "Electronic Specific Heat of Vanadium Chromium Hydride", Physical Review B, vol. 1, No. 6 (Mar. 15, 1970), pp. 2485-2487.

*Primary Examiner*—L. Dewayne Rutledge
*Assistant Examiner*—Christopher W. Brody
*Attorney, Agent, or Firm*—Sandra B. Weiss; James W. Weinberger; Richard G. Besha

[57] ABSTRACT

A ternary intermetallic compound having the formula $Zr(V_{1-x}Cr_x)_2$ where x is in the range of 0.01 to 0.90 is capable of reversibly sorbing hydrogen at temperatures ranging from room temperature to 200° C., at pressures down to $10^{-6}$ Torr. The compound is suitable for use as a hydrogen getter in low pressure, high temperature applications such as magnetic confinement fusion devices.

4 Claims, 3 Drawing Figures

METHOD OF GETTERING HYDROGEN UNDER CONDITIONS OF LOW PRESSURE

CONTRACTUAL ORIGIN OF THE INVENTION

The United States Government has rights in this invention pursuant to Contract No. W-31-109-ENG-38 between the U.S. Department of Energy and Argonne National Laboratory.

This is a division of application Ser. No. 196,710, filed Oct. 14, 1980 now abandoned.

BACKGROUND OF THE INVENTION

The invention relates to a ternary intermetallic-compound capable of reversibly sorbing hydrogen. More specifically, this invention relates to a ternary intermetallic-compound capable of gettering hydrogen at low pressures and at temperatures from about room to about 200° C. and which can be regenerated at low pressures and at temperatures from about 300°-500° C. The temperature and pressure ranges at which gettering and regeneration can occur can be controlled by varying the composition of the compound.

It is generally recognized that impurities in the plasma of magnetic confinement fusion devices such as Tokamaks can seriously limit the performance of such devices by lowering the plasma temperature and quenching the fusion reaction. These impurities are introduced into the plasma by a variety of sputtering and erosion processes occuring at the walls of the devices by hydrogen isotope recycling. These impurities may consist of oxygen, carbon and hydrogen, including the isotopes deuterium and tritium Some metal ions may also be included which have been sputtered from the wall of the device during operation.

Some solutions to the problem of impurity control include modifying the recycling processes, minimizing the erosion rates at the surfaces facing the plasma and removing the offending impurities from the plasma. It has been shown that the trapping and subsequent re-admission of hydrogen isotopes from walls affects plasma profiles, especially at the edge, substantially modifying impurity influxes. In deuterium-tritium burning devices, wall recycling will strongly influence tritium inventory, which must be held to within well-defined limits. Therefore, tritium retention is an important factor in the design of a suitable fusion device.

There is need for a material which can getter hydrogen and hydrogen isotopes under the low pressure, high temperature conditions present in operating magnetic containment fusion devices. Furthermore, the material must be capable of being regenerated for recycling under reasonable condition of pressure and temperature. Such a material can be placed in the fusion device either as a coating on the walls of the device or as a coating on sheets of substrate which can be placed within the device. Preferably the material is reasonably selective for hydrogen, must be able to function as a hydrogen and hydrogen isotope getter at pressures down to at least $10^{-6}$ torr, in the presence of power fluxes up to about 50 w/cm$^2$ and at temperatures from about room temperature up to about 200° C. Furthermore, the material should have a high hydrogen capacity in order to reduce the frequency of regeneration, it should be able to be regenerated with respect to absorbed hydrogen at a relatively low temperature, preferably no higher than 500° C., and it must be able to function as a hydrogen getter in the presence of other contaminant gases, such as CO, $O_2$ and $N_2$.

One such material which has been used successfully is sublimed titanium. However, titanium is not easily regenerated and fresh layers of titanium must be sublimed for each gettering cycle that is required, which is expensive and time consuming. Another material which fulfills many of the requirements is ST101 ®. This material is a proprietary Zr-Al based alloy available from SAES Getters of Milan, Italy. However, hydrogen capacity of the alloy is somewhat limited and regeneration of the alloy within a reasonable length of time requires that it be heated to temperatures of at least 750° C.

SUMMARY OF THE INVENTION

It has been found that the substitution of chromium for some of the vanadium in a zirconium-vanadium alloy will form a ternary intermetallic-compound, which is useful as a hydrogen getter under the vacuum and temperature environment found within most magnetic fusion devices. Furthermore, the alloy can be regenerated under vacuum conditions at temperatures as low as about 300° C. The ternary intermetallic compound has the formula $Zr(V_{1-x}Cr_x)_2$ where x is in the range of 0.01 to 0.90. By varying the amount of chromium present in the alloy, it is possible to control the pressure and temperature conditions under which the compound will getter hydrogen and most important the conditions under which the getter can be regenerated. This allows the chemical properties of the compound of the invention to be tailored to fit the operating and regeneration requirements in terms of pressure and temperature of different fusion devices.

It is therefore one object of the invention to provide a material which is suitable for use as a hydrogen getter in a fusion plasma type reactor.

It is another object of the invention to provide a ternary intermetallic compound which is capable of gettering hydrogen at temperatures varying from about room temperature to about 200° C. and at pressures down to about $10^{-6}$ torr.

It is still another object of the invention to provide a ternary intermetallic compound which is capable of gettering hydrogen at temperatures varying from about room temperature to about 200° C., at pressures down to about $10^{-6}$ torr, and which can be regenerated at temperatures from about 300° and 500° C.

Finally, it is the object of the invention to provide a ternary intermetallic compound in which the gettering conditions and the regenerating conditions can be controlled.

DESCRIPTION OF THE PREFERRED EMBODIMENT

The ternary intermetallic compound of the invention has the formula $Zr(V_{1-x}Cr_x)_2$ where x=0.01 to 0.90. The compound is prepared by melting together appropriate quantities of high-purity powder of zirconium, vanadium and chromium, in a furnace under an inert atmosphere, to form the compound. Preferably, each powdered mixture is melted together several times in order to ensure complete homogeniety of the alloy.

The homogenized intermetallic compound must be activated before it can be successfully used as a hydrogen getter. This is accomplished by contacting the compound with hydrogen gas at a pressure at least above the decomposition pressure of the compound, generally at least one to two atmospheres, for a period of time sufficient to hydride the compounds, generally from $\frac{1}{2}$ to 2 hours. It may be preferred to granulate the material to $\frac{1}{4}$ to $\frac{1}{2}$ inch particles to ensure complete activation.

The amount of chromium in the alloy may vary from about 0.01 to about 0.9 mols. An increase of chromium in the alloy will lower the temperature at which gettering will take place at a given pressure and will also lower the hydrogen capacity of the alloy. Thus, the exact amount of chromium desired in an alloy will depend upon the pressure and temperature conditions under which hydrogen gettering is to take place and perhaps more importantly, on the pressure and temperature conditions which are available to regenerate the getter.

X-ray diffraction patterns taken of the compound of the invention by the Debye-Scherrer method with filtered Cu radiation, have shown that the crystal structure is of the cubic $MgCu_2$-type. Lattice expansion on hydriding was found to be about 20% for the compound $Zr(V_{0.4} Cr_{0.6})_2$.

EXAMPLE I

An intermetallic compound having the formula $Zr(V_{0.4} Cr_{0.6})_2$ was prepared by placing a charge containing the appropriate quantities of 99.9% purity powdered materials into water-cooled copper crucible. The charge was melted three times at 100 amps with a tungsten electrode under an argon atmosphere.

Figure 1:
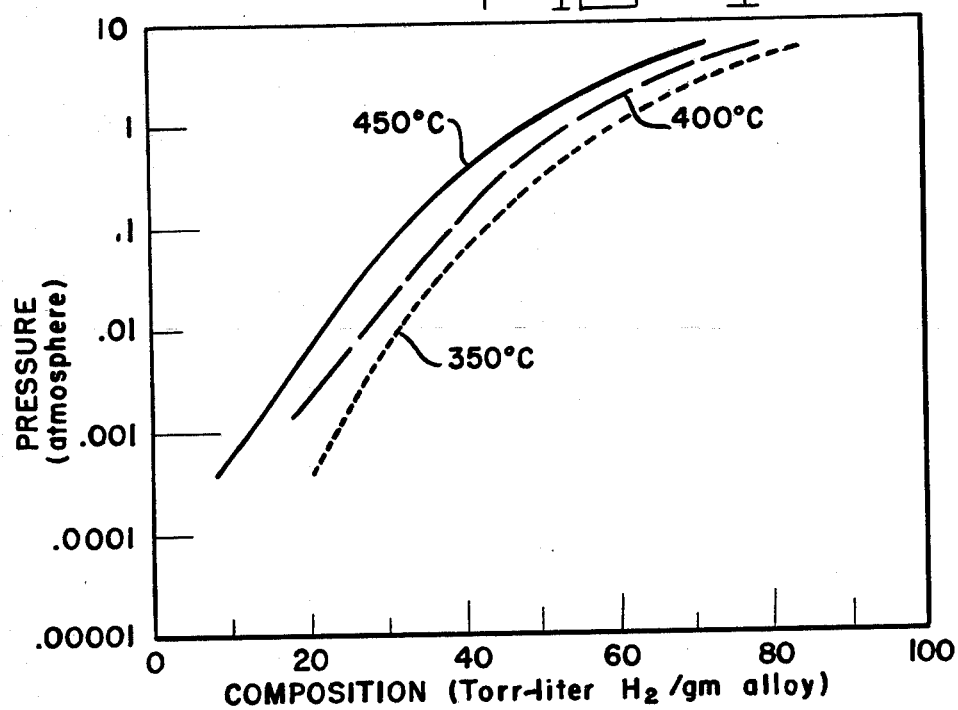
FIG. 1 contains several curves showing hydrogen absorption isotherms for the compound $Zr(V_{0.4}Cr_{0.6})_2$ at several different temperatures.

1.0104 gm of the sample was then placed in a quartz tube and connected to an all metal vacuum line. The sample was activated at room temperature with a hydrogen pressure of 27 psia. After the initial hydrogen absorption, the hydrogen was then removed by pumping on the sample at 700° C. An adsorption isotherm for the sample at 450° C. was prepared by heating the sample to that temperature, adding about 10 Torr-liters of $H_2$ to the alloy and waiting 10 to 60 minutes for the pressure to equilibrate. After equilibration, the pressure was noted and another aliquot of about 10 Torr-liters of hydrogen gas was added to the tube and the pressure equilibrated again. This procedure was repeated until a maximum composition of 60–80 Torr-liters of $H_2$ absorbed/gm alloy was reached. In a like manner, hydrogen isotherms for material of the same composition at 400° C. and 350° C. were also determined. The results are shown in FIG. 1.

EXAMPLE II

Figure 2:
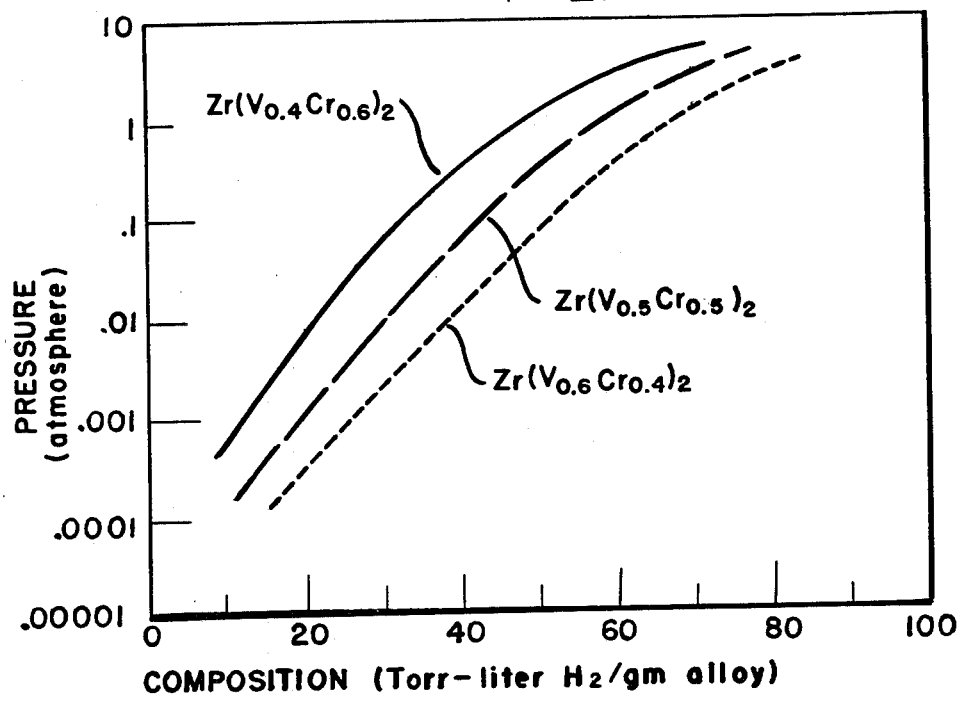
FIG. 2 contains several curves showing pressure composition absorption isotherms at 450° C. for the compound $Zr(V_{1-x}Co_x)_2$ where x=0.4, 0.5 and 0.6.

Additional samples of the ternary intermetallic compound having the formula $Zr(V_{0.5} Cr_{0.5})_2$ and $Zr(V_{0.6} Cr_{0.4})_2$ were prepared and activated as described in Example I. A hydrogen absorption isotherm for the samples at 450° C. was then prepared. The results are shown in FIG. 2. For comparison, the isotherm for $Zr(V_{0.4} Cr_{0.6})_2$ at 450° C. taken from FIG. 1 is also shown.

EXAMPLE III

As a test of the gettering capability of the material, a 0.2558 gm sample of a hydrided alloy of the composition $Zr(V_{0.6} Cr_{0.4})_2 H_x$ was weighted into one chamber of a quartz tube having two chambers. The tube was connected to a high vacuum system. The sample was heated to about 500° C. and degassed at a pressure of $8 \times 10^{-7}$ Torr. The getter was then cooled and maintained at a temperature of about 200° C. The vessel containing the getter was valved off and a pressure of $2.6 \times 10^{-2}$ Torr of hydrogen gas was admitted to the main chamber of the quartz tube. The getter was then exposed to the hydrogen gas. Within 1 minute the system pressure dropped to about $3 \times 10^{-5}$ Torr, confirming the capability of the material to getter hydrogen at low pressures and temperatures of 200° C.

EXAMPLE IV

The hydrided alloy of Example III was regenerated by heating to about 500° C. and pumping to a pressure of about $7 \times 10^{-7}$ Torr which removed most of the hydrogen gas absorbed in the previous example. The getter was cooled to about 200° C. and isolated from the main chamber. Hydrogen gas was again added to the main chamber, which had a volume of about 1 liter, at a pressure of $3.3 \times 10^{-2}$ Torr. When the valve to the getter chamber was opened, the system pressure dropped to $3 \times 10^{-5}$ Torr within one minute. It was determined that the getter absorbed about 0.03 Torr-liters of hydrogen gas.

EXAMPLE V

Figure 3:
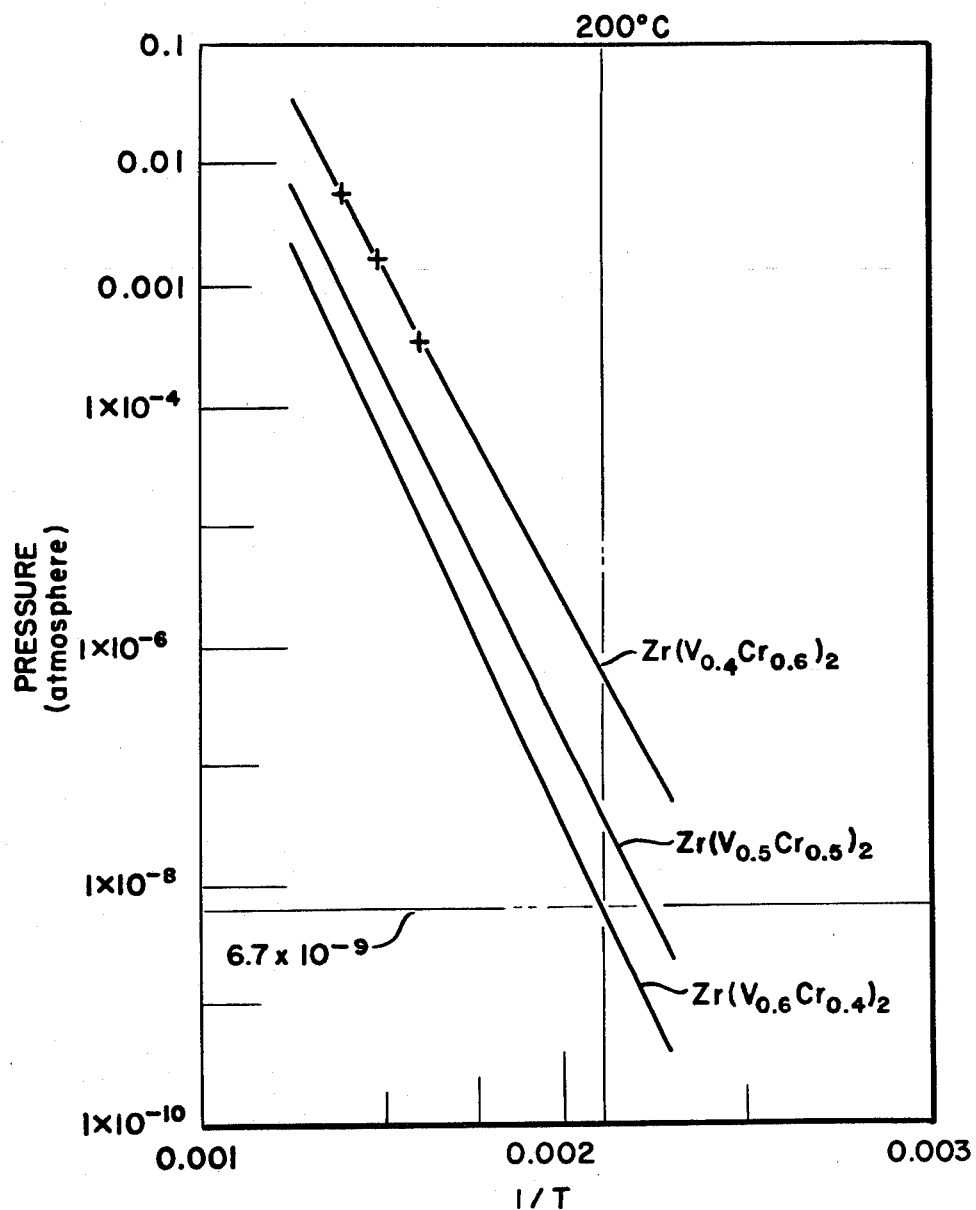
FIG. 3 contains several curves showing the relationship between gettering pressure and temperature.

FIG. 3 which contains several curves showing the relationship between gettering pressure and temperature for several compounds of the invention was derived from FIGS. 1 and 2 in the following manner. For the alloy $Zr(V_{0.4} Cr_{0.6})_2$, the pressures at three temperatures (450°, 400° and 350° C.) were taken from FIG. 1 at a hydrogen composition of 20 Torr-liters $H_2$ absorbed/gm alloy and plotted on FIG. 3. To obtain these lines for $Zr(V_{0.5} Cr_{0.5})_2$ and $Zr(V_{0.6}Cr_{0.4})_2$, the presures at 450° C. at the hydrogen composition of 20 Torr-liters $H_2$ absorbed/gm alloy were taken from FIG. 2 After assuming the thermodynamic entropies to be equal for all three compounds, the lines shown in FIG. 3 were drawn.

From given operating temperature it is possible using FIG. 3 to determine the minimum hydrogen partial pressure which can be gettered for each compound. Thus for an operating temperature of about 200° C. the compound $Zr(V_{0.6} Cr_{0.4})_2$ has a minimum hydrogen partial pressure which can be gettered of about $5 \times 10^{-6}$ Torr (about $6.2 \times 10^{-9}$ atm), while $Zr(V_{0.5} Cr_{0.5})_2$ has a pressure of about $5 \times 10^{-8}$ atm. It may further be seen from FIG. 3 that the minimum hydrogen partial pressure which can be gettered increases as the proportion of chromium in the gettering compound increases. In addition, it may be seen that as the proportion of chromium in the gettering compound increases the gettering temperature decreases. It is clear from the diagram that a gettering compound can be specifically formulated for the temperature and pressure requirements of a particular gettering environment by preselecting the proportions of vanadium and chromium in the compound.

The regeneration temperature is a complex function of the system pumping speed, the regeneration time allowed, and the extent of regeneration required, i.e. how much hydrogen must be removed. For $Zr(V_{0.6}Cr_{0.4})_2$ any temperature over 200° C. will cause some amount of regeneration, that is to say decomposition of the hydride to alloy hydrogen gas. In general, while any temperature above the operating temperature may be used as a regeneration temperature, the highest permissible regeneration temperature should be used to effect the most complete and most rapid regeneration.

From the preceeding discussion and Examples, it can be seen that the ternary metallic compound of the invention is capable of gettering hydrogen at pressures down to $10^{-7}$ Torr at temperatures varying from about room up to about 200° C. and furthermore that the compound can be regenerated for recycle at temperatures varying from 300° to 500° C.

The embodiments of this invention in which an exclusive property or privilege is claimed are defined as follows:

1. In a method of gettering hydrogen from a low pressure environment comprising contacting the hydrogen at a pressure as low as $10^{-6}$ torr with a ternary intermetallic compound, the improvement wherein said compound has the formula $Zr(V_{1-x}Cr_x)_2$ where $0.01 \leq x \leq 0.90$, and wherein x is preselected in accordance with the requirements of said gettering environment such that when x is low, the minimum hydrogen gettering pressure is lower and the gettering temperature is higher, and when x is high, the minimum hydrogen gettering pressure is higher and the gettering temperature is lower.

2. The method of claim 1 wherein the temperature is from room temperature to about 200° C.

3. The method of claim 2 wherein the ternary compound is regenerated by heating the compound to between 300° and 500° C.

4. The method of claim 3 wherein the ternary compound is heated to 500° C. at a pressure of about $10^{-7}$ Torr.

* * * * *